United States Patent [19]
Hawker et al.

[11] Patent Number: 6,002,949
[45] Date of Patent: Dec. 14, 1999

[54] HANDSET WITH A SINGLE TRANSDUCER FOR HANDSET AND HANDSFREE FUNCTIONALITY

[75] Inventors: Larry Edward Hawker, Nepean; Andre John Van Schyndel, Kanata; Christopher Michael Forrester, Ottawa, all of Canada

[73] Assignee: Nortel Networks Corporation, Montreal, Canada

[21] Appl. No.: 08/972,355

[22] Filed: Nov. 18, 1997

[51] Int. Cl.$^6$ ...................................................... H04Q 7/32
[52] U.S. Cl. ........................ 455/569; 455/90; 455/575; 361/814; 379/420; 379/428; 379/433
[58] Field of Search ............................... 455/89, 90, 569, 455/575; 361/814; 379/420, 433, 421, 429, 430, 428, 388

[56] References Cited

U.S. PATENT DOCUMENTS

| | | | |
|---|---|---|---|
| 5,276,916 | 1/1994 | Pawlish et al. | 455/89 |
| 5,402,486 | 3/1995 | Wang et al. | 379/433 |
| 5,588,041 | 12/1996 | Meyer, Jr. et al. | 378/59 |
| 5,610,971 | 3/1997 | Vandivier | 379/433 |
| 5,642,402 | 6/1997 | Vilmi et al. | 455/90 |
| 5,664,012 | 9/1997 | Chen | 379/420 |
| 5,664,015 | 9/1997 | Ford et al. | 379/433 |
| 5,729,604 | 3/1998 | Van Schyndel | 379/388 |
| 5,749,057 | 5/1998 | Takagi | 455/569 |
| 5,778,061 | 11/1994 | Parment et al. | 379/428 |
| 5,790,679 | 6/1996 | Hawker et al. | 455/569 |

*Primary Examiner*—Wellington Chin
*Assistant Examiner*—Simon Nguyen

[57] ABSTRACT

A wireless terminal for personal communication systems is provided with handsfree and handset receive modes of operation utilizing a single transducer. The transducer is mounted within a specially designed enclosure having front and back chambers separated by a partition. The partition contains strategically located internal vents and the front chamber contains strategically located acoustic ports for shaping the frequency response and providing good audio quality in each mode. The back chamber may also contain strategically located acoustic ports. Amplification and equalization circuitry may be employed to further adjust the amplifier gain and shape the frequency response for dual mode operation. The terminal may additionally be equipped with a proximity detector to assist in switching between operating modes of operation. The transducer may also be used to generate the alerting (ringing or buzzing) signal.

29 Claims, 2 Drawing Sheets

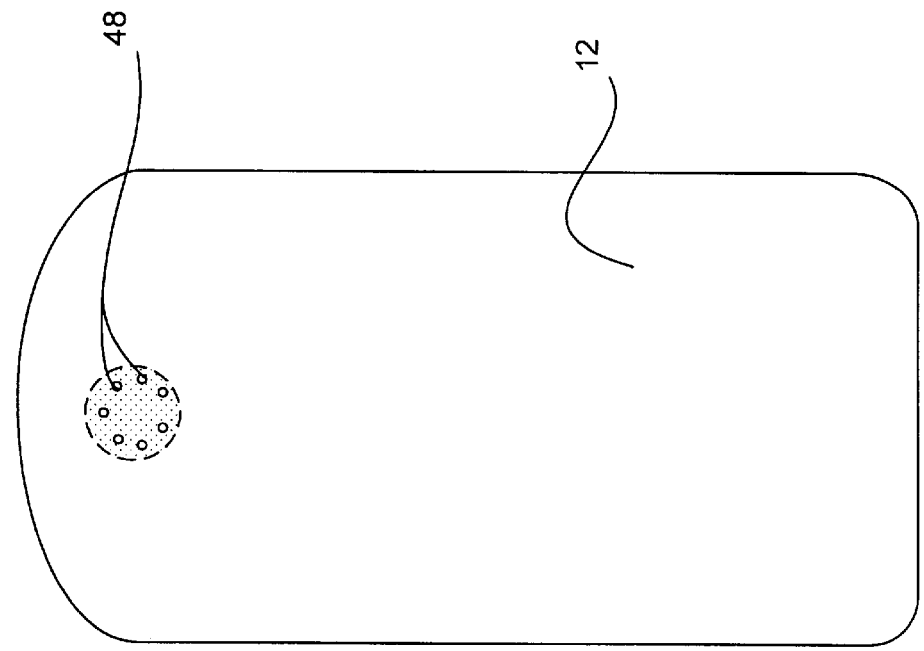
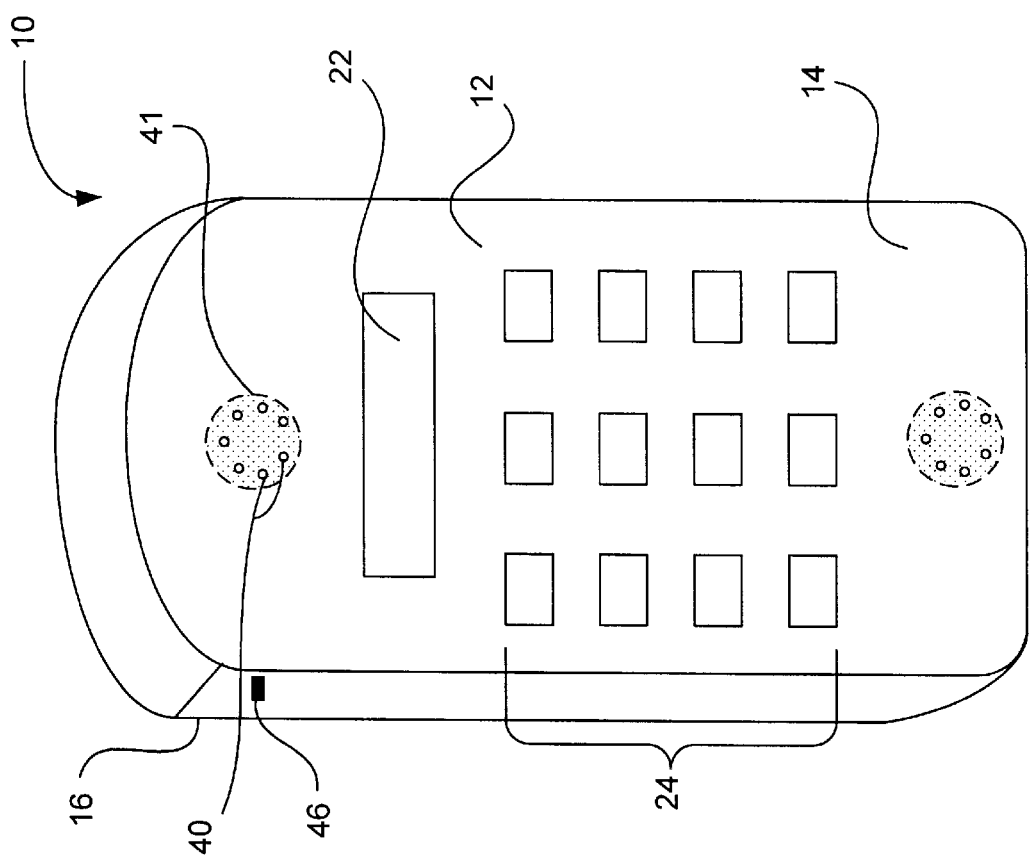

HANDSET WITH A SINGLE TRANSDUCER FOR HANDSET AND HANDSFREE FUNCTIONALITY

FIELD OF THE INVENTION

This invention relates to a communications device such as a wireless terminal and more particularly to such a device wherein a single transducer provides both handset receive and handsfree receive modes of operation.

BACKGROUND OF THE INVENTION

Communications devices including wireless terminals for personal communication systems and the like conventionally use a receiver which is held close to the user's ear during operation for both privacy and good audio quality. Recently, however, devices have been developed which also include a loudspeaker, either as an integral part of the terminal, or as an accessory, to provide either just handsfree listening (receive mode) or as part of a complete handsfree (transmit and receive) system.

Users of such telephone services as voice mail and automated answering systems often find it more convenient to navigate these services through the use of the dial pad while listening to instructions through the loudspeaker as opposed to continuously moving the receiver away from the ear to see the dial pad. This becomes even more important when the terminal has an integral display which the user needs to see and perhaps write on while listening.

Conventional terminals also use a separate transducer, typically a piezo or a magnetic sounder, for providing alerting functionality (ringing or buzzing). The capabilities of these transducers are generally quite limited, thereby limiting the loudness and/or the audio quality of the alerting signal.

In the interest of conserving space and minimizing component and assembly costs it would be advantageous to provide both handset and handsfree receive modes of operation (or simply handset and handsfree modes) with a single transducer. At the same time, of course, the audio quality must satisfy various industry standards and meet user expectations while the terminal is either loosely or tightly coupled to the ear in handset mode, or at some distance from the user's ear in handsfree mode. One such standard requires that the frequency response delivered by the loudspeaker to the user in both handset and handsfree modes be relatively flat over a frequency range of 300 to 3300 Hz. It is also expected that the overall output signal level in handset mode be lower than in handsfree mode. When a loudspeaker that provides a flat frequency response in handsfree mode is used in handset mode, where the output signal level is lower, the frequency response in handset mode will emphasize lower frequencies over higher frequencies. Therefore, to maintain acceptable audio, the relative amplitude of the lower frequencies produced by the loudspeaker in handset mode must be reduced.

Further reduction in the space required and cost of manufacture can be attained by providing the alerting functionality with the same transducer used in handset and handsfree modes. Given a way to evaluate the proximity of the user to the terminal, the alerting signal could be made loud when the user is far from the terminal, yet soft when the user is close to the terminal.

As indicated previously, some manufacturers of wireless terminals have both handset and handsfree functionality in their products. These products, however, achieve dual mode operation through the use of separate transducers for each function.

It is also known to use "leak-insensitive" or "low acoustic output impedance" receivers in order to provide good audio quality when the terminal is loosely coupled to the ear. However, such receivers do not provide handsfree functionality.

SUMMARY OF THE INVENTION

The invention may be summarized, according to a first broad aspect, as a communications device comprising a casing having a front face and a back face, and a transducer enclosure between the front face and the back face, comprising front and back chambers respectively adjacent the front and back faces, separated by a partition having at least one internal vent joining the front and back chambers, the front chamber having at least one acoustic port communicating with the exterior of the enclosure, the enclosure further comprising a shutter for covering the at least one internal vent in a handsfree mode and uncovering the at least one internal vent in a handset mode. The communications device further comprises a transducer for converting electrical signals into sound, the transducer directing sound into the front and back chambers. Preferably, the second chamber also has at least one acoustic port communicating with the exterior of the enclosure.

In a preferred embodiment of the invention the communications device is a wireless terminal for a personal communication system. The enclosure is incorporated into the terminal such that the acoustic ports and internal vents are in the housing of the terminal.

According to a second broad aspect, the invention provides a transducer enclosure for use in a communications terminal. The enclosure comprises front and back chambers separated by a partition having at least one internal vent extending between the front and back chambers, the front chamber having at least one acoustic port communicating with the exterior of the enclosure. The enclosure further comprises a shutter for covering the at least one internal vent in a handsfree mode and uncovering the at least one internal vent in a handset mode. Preferably, the second chamber also has at least one acoustic port communicating with the exterior of the enclosure.

BRIEF DESCRIPTION OF THE DRAWINGS

A preferred embodiment of the invention will now be described with reference to the attached drawings in which:

FIG. 1 is a perspective view of a wireless terminal in accordance with one embodiment of the present invention;

FIG. 2 is a back view of the terminal of FIG. 1; and

DETAILED DESCRIPTION OF THE PREFERRED EMBODIMENT

Figure 3:
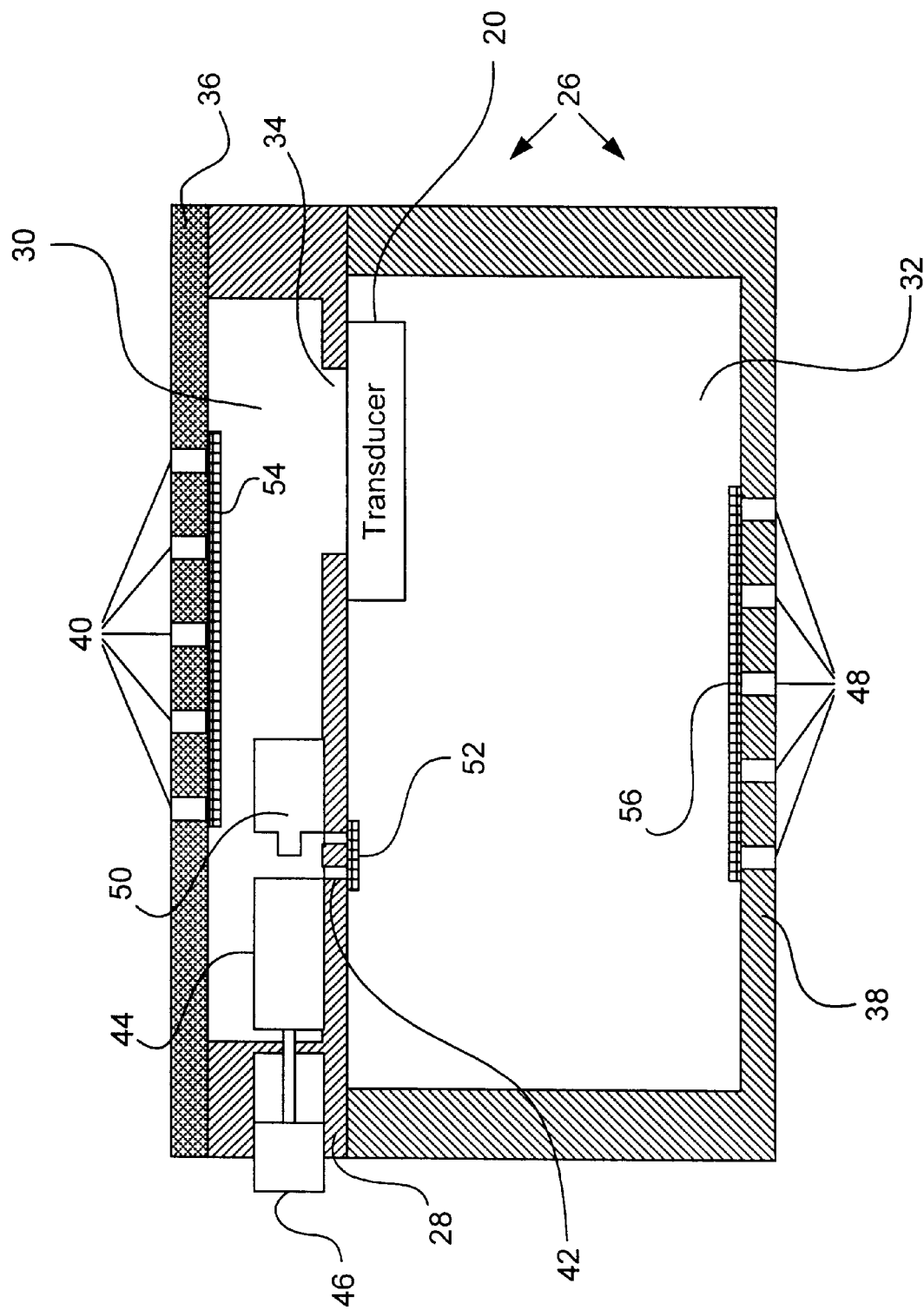
FIG. 3 is a cross-sectional view of the transducer and enclosure for use in the terminal of FIG. 1.

FIG. 1 illustrates one example of a wireless terminal such as might be used in a personal communication system. It is to be understood that the invention has equal application in other types of communications devices such as cordless terminals and pagers.

As shown in FIG. 1, terminal 10 includes a case or housing 12, having a receive end 16 and a transmit end 14. A transducer (not shown) for converting a first electrical signal, also known as an output audio signal, into sound is located within housing 12 proximate receive end 16. The output audio signal is received from amplification and equalization circuitry (not shown) forming part of terminal 10. Positioned within housing 12 and close to transmit end 14 is another transducer (not shown), known as a microphone, for converting sound into a second electrical signal. FIG. 1 also illustrates a display 22 and a dial pad 24 as known in the art.

The transducer located proximate receive end 16 is shown in detail in FIG. 3 and is indicated by 20. Transducer 20 is located within a transducer enclosure 26 which in a preferred embodiment is cylindrical. It is within the scope of the present invention to provide differing transducer enclosure shapes and sizes. It is to be understood, for example, that the enclosure may have configurations in plan such as square, rectangular or elliptical.

The enclosure 26 has a partition 28 which divides the enclosure into a front chamber 30 and a back chamber 32, respectively located towards the front and back faces of the terminal 12. Transducer 20 is mounted in or coaxially with an opening 34 in partition 28, and is installed in such a way that sound waves produced by transducer 20 are directed into the front chamber 30 and back chamber 32. The transducer in an exemplary embodiment is a twenty-eight millimeter (mm) diameter flat loudspeaker. Enclosure 26 and partition 28 can be molded or otherwise formed of the same or similar plastics material as used for the terminal casing. The partition 28 contains one or more internal vents 42, which may be covered or uncovered by means of a shutter 44 under control of a mode switch 46. In an exemplary embodiment, there are twelve internal vents, each having a diameter of approximately 1.5 mm. The internal vents may be covered with a layer of acoustic resistance material 52 which provides frequency response shaping, and minimizes resonances between the internal vents and chambers.

When the internal vents 42 are uncovered, they allow free passage of sound waves, especially those of low frequency, from one chamber to another. When the internal vents 42 are shut, sound waves are prevented from crossing from one chamber into another through the internal vents. In the illustrated embodiment, mode switch 46 controls the shutter 44 which is a linear shutting mechanism for covering and uncovering the internal vents 42. It is understood that the shutter may alternatively be similar to that used to cover a camera lens, or otherwise different from the linear mechanism shown in FIG. 3. It is also understood that the shutter 44 is required to cover the internal vents 42, but need not cover them so tightly as to seal them.

Mode switch 46 also controls a handset/handsfree electronic switch 50, which is connected to amplification and equalization circuitry used to adjust the gain and frequency response characteristics of the output audio signal. When mode switch 46 is set so that the shutter 44 covers the internal vents 42, the electronic switch 50 is said to be in handsfree position and the terminal is said to be in handsfree mode. Conversely, when the internal vents 42 are uncovered, the electronic switch 50 is said to be in handset position and the terminal in handset mode. Accordingly, the electronic switch 50 in FIG. 3 is in handset position and the terminal whose transducer enclosure is depicted would be in handset mode.

Referring now both to FIG. 1 and FIG. 3, front chamber 30 has an arrangement of acoustic ports 40 communicating with the exterior of the terminal, and located within a circular portion 41 of the front face such that they are easily sealed within the knife-edge of a frequency response testing artificial ear. In an exemplary embodiment there are twelve ports each having a diameter of approximately 1.5 mm. The acoustic ports 40 may be covered with a layer of acoustic resistance material 54 similar to that which might cover the internal vents 42.

Back chamber 32 also permits the escape of acoustic energy through one or more acoustic ports 48, similar in size to the acoustic ports 40 joining front chamber 30 with the exterior of the terminal. The arrangement of the acoustic ports 48 on the back face may be circular, as depicted in the back view of the terminal 12 shown in FIG. 2. It is understood, however, that the ports may be arranged elliptically or otherwise differently from the illustrated pattern. The acoustic ports 48 in back chamber 32 may also be covered with a layer of acoustic resistance material 56 similar to that which might cover the internal vents 42 or the acoustic ports 40.

It will be noted that in FIG. 3 the two chambers 30,32 do not have equal volumes by virtue of the partition 28 being closer to one end of the enclosure 26. It should also be noted that the dimensional relationship between the two chambers is not critical but is a function of other acoustic properties of the enclosure including number, size and location of the internal vents 42 and acoustic ports 40,48. In the embodiment shown in FIG. 3 front chamber 30 has an approximate volume of 2 cubic centimeters (cc) and back chamber 32 has an approximate volume of 40 cc. Top 36 and bottom 38 close each of the chambers, forming a cylinder.

It will be apparent to one skilled in the art that the top 36 and bottom 38 can be part of the terminal 12. It is also to be understood that top 36 and bottom 38 may have inner or outer surfaces that are curved instead of right-angled.

In still other embodiments of the present invention, the transducer may be attached otherwise than to partition 28, the important consideration being that the transducer is airtightly mounted in or coaxially with the opening 34 in partition 28. For example, the transducer may be attached to top 36 or bottom 38 by a rigid arm instead of being directly mounted on the partition 28. It is also within the scope of the present invention to place acoustic foam in one or both of chambers 30,32 in order to increase the effective volumes and minimize the effects of any resonances. Furthermore, other components may be arranged within the terminal housing so as to form the appropriate chambers. In this case it will be necessary to configure the physical dimensions of the various acoustic ports and internal vents and to select the proper characteristics of the acoustic resistance material and foam to accommodate some effects due to internal channels and cavities created by circuit boards, the shutter, and other components. This implementation may also require adjustment to the gain and equalization provided by the amplification and equalization circuitry.

In operation, mode switch 46 controls the shutter 44 which will, upon covering or uncovering the internal vents 42, respectively set the electronic switch 50 to either handsfree or handset position. The mode switch 46 may be activated manually by pressing a button or otherwise touching a part of the terminal 10. In a preferred embodiment, however, the terminal will have a proximity detector which, by means of an electromechanical actuator such as a miniature electric motor or solenoid, automatically activates mode switch 46 depending on the proximity of the terminal to the user. Therefore, in a preferred embodiment, moving the terminal close to the user will cause the proximity detector to activate mode switch 46 in such a way that shutter 44 uncovers the internal vents 42, thus setting the electronic switch 50 to handset position and putting the terminal in handset mode. Moving the terminal away from the user causes the opposite to occur, and the terminal is put in handsfree mode. Details respecting a suitable proximity detector may be found in U.S. application Ser. No. 08/615,908 filed Mar. 14, 1996 by A. Van Schyndel. The contents of U.S. application Ser. No. 08/615,908 are incorporated herein by reference.

To ensure good audio quality while the terminal is in handset mode with the terminal loosely or tightly coupled to the user's ear, or while the terminal is in handsfree mode, the output audio level as a function of frequency must be adjusted for each mode so as to fall within a certain range. A transducer which can provide the user with a flat frequency response over the range of 300 Hz to 3300 Hz in handsfree mode (with the internal vents shut) will tend to overemphasize low-frequency components in handset mode as the overall output signal level is lowered (if the internal vents are kept shut). Uncovering the internal vents 42 in handset mode allows the lower frequency components of the sound produced by the transducer 20 to "bleed" into the back chamber 32, thus reducing the relative amplitude of the lower frequencies presented to the user. The desired amount of bleeding can be partially achieved by the appropriate design of the transducer enclosure, the acoustic ports and the internal vents. In addition, appropriate amounts of amplification and electronic equalization may be employed to achieve the required output audio level over the desired frequency range in handset mode with the terminal loosely or tightly coupled to the user's ear, or in handsfree mode.

In a preferred embodiment, the transducer will also provide alerting functionality (ringing or buzzing). Depending on the proximity of the user to the terminal, an incoming call will cause an alerting sound of variable loudness to be generated by the transducer. If the proximity detector determines that the user is close to the terminal, the alerting sound will be softer than it would be if the user were judged far from the terminal. Electronic equalization and amplifier gain adjustment are performed as a function of the mode of the terminal as determined by the signal from the proximity detector.

In the illustrated embodiment, the back chamber 32 has acoustic ports which permit the escape of acoustic energy to assist in shaping the overall frequency response. These are not essential. By appropriately adjusting the amplifier gain and electronic equalization, a satisfactory frequency response can be achieved without the need for acoustic ports in the back chamber. The amplification and equalization circuitry required by an embodiment without acoustic ports in the back chamber may therefore be additional or otherwise different from that required by the illustrated embodiment.

In situations where it is envisaged that the terminal will be often carried in a briefcase or pocket, a proximity detector may have difficulty determining whether the surface that it finds itself close to is in fact the user's ear. In such a case, an additional "backup" alerting transducer could be added, which would be automatically switched on when a louder alerting sound is required and which would produce a sufficiently loud buzzing or ringing sound. Terminals comprising such a backup transducer still benefit from not having separate transducers for handset and handsfree modes of operation.

While the preferred embodiment of the invention has been described and illustrated it will be apparent to one skilled in the art that variations in the design may be made. The scope of the invention, therefore, is only to be limited by the claims appended hereto.

We claim:

1. A communications device comprising:
   a casing having a front face and a back face;
   a transducer enclosure between the front face and the back face, comprising front and back chambers respectively adjacent the front and back faces, separated by a partition having at least one internal vent joining the front and back chambers, the front chamber having at least one acoustic port communicating with the exterior of the enclosure, the enclosure further comprising a shutter for covering the at least one internal vent in a handsfree mode and uncovering the at least one internal vent in a handset mode;
   a transducer airtightly mounted in or coaxially with an opening in the partition for converting electrical signals into sound, the transducer directing sound into the front and back chambers.

2. A communications device as defined in claim 1, wherein the back chamber also has at least one acoustic port communicating with the exterior of the enclosure.

3. A communications device as defined in claim 1, wherein at least one of the acoustic ports and internal vents is covered with a layer of acoustic resistance material.

4. A communications device as defined in claim 1, the transducer enclosure further comprising a mode switch to select between handset mode and handsfree modes.

5. A communications device as defined in claim 4, the mode switch causing the shutter to cover the at least one internal vent in handsfree mode, and to uncover the at least one internal vent in handset mode.

6. A communications device as defined in claim 5, the mode switch being a manual push-button type switch.

7. A communications device as defined in claim 5, the mode switch being an automatically activated switch, under control of a proximity detector, the proximity detector causing the switch to select either handset mode when a user is close to the communications device or handsfree mode when a user is far from the communications device.

8. A communications device as defined in claim 5, wherein amplification and equalization circuitry is used to vary output audio level and frequency response.

9. A communications device as defined in claim 8, wherein the mode switch activates an electronic switch used to selectively control the amplification and equalization circuitry in handset and handsfree modes.

10. A communications device as defined in claim 1, the device being a wireless terminal for communication systems.

11. A communications device as defined in claim 1, the front chamber having smaller volume than the back chamber.

12. A communications device as defined in claim 1, wherein at least one of the front and back chambers contains an acoustic foam.

13. A communications device as defined in claim 1, the transducer providing a substantially flat frequency response over the frequency range 300 Hz to 3300 Hz.

14. A communications device as defined in claim 1, the transducer providing alerting functionality.

15. A communications device as defined in claim 2, wherein at least one of the acoustic ports and internal vents is covered with a layer of acoustic resistance material.

16. A communications device as defined in claim 2, the transducer enclosure further comprising a mode switch to select between handset and handsfree modes.

17. A communications device as defined in claim 16, the mode switch causing the shutter to cover the internal vents in handsfree mode, and to uncover the internal vents in handset mode.

18. A communications device as defined in claim 17, the mode switch being a manual push-button type switch.

19. A communications device as defined in claim 17, the mode switch being an automatically activated switch, under control of a proximity detector, the proximity detector causing the switch to select either handset mode when a user is close to the communications device or handsfree mode when a user is far from the communications device.

20. A communications device as defined in claim 17, wherein amplification and equalization circuitry is used to vary output audio level and frequency response.

21. A communications device as defined in claim 20, wherein an electronic switch is used to selectively control the amplification and equalization circuitry in handset and handsfree modes.

22. A transducer enclosure for use in a communications device, comprising front and back chambers separated by a partition having at least one internal vent extending between the front and back chambers, the front chamber having at least one acoustic port communicating with the exterior of the enclosure, the enclosure further comprising a shutter for covering the at least one internal vent in a handsfree mode and uncovering the at least one internal vent in a handset mode.

23. A transducer enclosure as defined in claim 22, wherein the back chamber also has at least one acoustic port communicating with the exterior of the enclosure.

24. A transducer enclosure as defined in claim 22, the enclosure further comprising a mode switch to select between handset and handsfree modes.

25. A transducer enclosure as defined in claim 24, the mode switch causing the shutter to cover the at least one internal vent in handsfree mode, and to uncover the at least one internal vent in handset mode.

26. A transducer enclosure as defined in claim 25, the mode switch being an automatically activated switch, under control of a proximity detector, the proximity detector causing the switch to select either handset mode when a user is close to the communications device or handsfree mode when a user is far from the communications device.

27. A transducer enclosure as defined in claim 23, the enclosure further comprising a mode switch to select between handset and handsfree modes.

28. A transducer enclosure as defined in claim 27, the mode switch causing the shutter to cover the at least one internal vent in handsfree mode, and to uncover the at least one internal vent in handset mode.

29. A transducer enclosure as defined in claim 28, the mode switch being an automatically activated switch, under control of a proximity detector, the proximity detector causing the switch to select either handset mode when a user is close to the communications device or handsfree mode when a user is far from the communications device.

* * * * *